United States Patent
Giles et al.

(10) Patent No.: US 12,529,354 B2
(45) Date of Patent: Jan. 20, 2026

(54) WIND TURBINE ROTOR BLADE PITCH CONTROL FOR TOWER FATIGUE REDUCTION

(71) Applicant: VESTAS WIND SYSTEMS A/S, Aarhus N (DK)

(72) Inventors: Alexander Duncan Giles, Oporto (PT); Jesper Sandberg Thomsen, Hadsten (DK); Bruno Martins Cunha, Guimarães (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 19/119,703

(22) PCT Filed: Oct. 13, 2023

(86) PCT No.: PCT/DK2023/050245
§ 371 (c)(1),
(2) Date: Apr. 9, 2025

(87) PCT Pub. No.: WO2024/083294
PCT Pub. Date: Apr. 25, 2024

(65) Prior Publication Data
US 2026/0002514 A1    Jan. 1, 2026

(30) Foreign Application Priority Data
Oct. 21, 2022    (DK) .............................. PA202270510

(51) Int. Cl.
*F03D 7/04*    (2006.01)
*F03D 7/02*    (2006.01)

(52) U.S. Cl.
CPC ......... *F03D 7/0224* (2013.01); *F03D 7/0302* (2023.08); *F03D 7/046* (2013.01);
(Continued)

(58) Field of Classification Search
CPC ...... F03D 7/0224; F03D 7/0302; F03D 7/046; F05B 2240/95; F05B 2200/13;
(Continued)

(56) References Cited

U.S. PATENT DOCUMENTS

| | | | |
|---|---|---|---|
| 2007/0041837 A1* | 2/2007 | Ide ......................... | F03D 7/024 416/147 |
| 2014/0255185 A1* | 9/2014 | Plano Morillo ........ | F03D 7/046 416/43 |

(Continued)

FOREIGN PATENT DOCUMENTS

| | | | | |
|---|---|---|---|---|
| CN | 113217278 A | * | 8/2021 | ............. F03D 17/00 |
| EP | 2620639 A1 | | 7/2013 | |

(Continued)

OTHER PUBLICATIONS

International Search Report/Written Opinion issued to PCT/DK2023/05245 on May 2, 2023.
(Continued)

*Primary Examiner* — Nathaniel E Wiehe
*Assistant Examiner* — Theodore C Ribadeneyra
(74) *Attorney, Agent, or Firm* — Patterson + Sheridan, LLP; Gero G. McClellan (57) ABSTRACT

The invention relates to adjusting collective pitch of the wind turbine rotor blades. A sensor signal is received, from wind turbine sensors, indicative of wind turbine rotor loading in a fore-aft direction. A first component is determined, based on the received sensor signal, in the fore-aft direction, the first component including high frequency collective content, greater than 2P frequency content, from the received sensor signal. A second component that is orthogonal to the first component is generated. The first and second components are rotated about a phase angle to obtain first and second phase-shifted components. A collective pitch
(Continued)

reference offset value is determined for the three rotor blades based on the first or the second phase-shifted component. A control signal is transmitted to adjust collective pitch of the rotor blades based on the determined collective pitch reference offset value.

14 Claims, 7 Drawing Sheets

(52) U.S. Cl.
CPC ....... *F05B 2200/13* (2013.01); *F05B 2240/95* (2013.01); *F05B 2260/966* (2013.01); *F05B 2270/331* (2013.01); *F05B 2270/334* (2013.01); *F05B 2270/604* (2013.01); *F05B 2270/807* (2013.01); *F05B 2270/808* (2013.01)

(58) Field of Classification Search
CPC .......... F05B 2260/966; F05B 2270/331; F05B 2270/334; F05B 2270/604; F05B 2270/807; F05B 2270/808
See application file for complete search history.

(56) References Cited

U.S. PATENT DOCUMENTS

| | | |
|---|---|---|
| 2015/0132129 A1 | 5/2015 | Atzler et al. |
| 2016/0377057 A1 | 12/2016 | Caponetti et al. |
| 2019/0055923 A1 | 2/2019 | Caponetti et al. |
| 2020/0011296 A1 | 1/2020 | Caponetti et al. |
| 2021/0207583 A1 | 7/2021 | Dalsgaard et al. |
| 2021/0231102 A1* | 7/2021 | Thomsen .............. F03D 7/0296 |
| 2022/0220937 A1 | 7/2022 | Thomsen et al. |

FOREIGN PATENT DOCUMENTS

| | | |
|---|---|---|
| EP | 3719299 A1 | 10/2020 |
| WO | 2020239177 A1 | 12/2020 |

OTHER PUBLICATIONS

1st Technical Examination issued to patent application No. PA 202270510 on May 17, 2023.

* cited by examiner

WIND TURBINE ROTOR BLADE PITCH CONTROL FOR TOWER FATIGUE REDUCTION

TECHNICAL FIELD

The invention relates to controlling pitch of rotor blades of a wind turbine and, in particular, to adjusting collective blade pitch reduce fatigue of a tower of the wind turbine.

BACKGROUND

Wind turbines as known in the art include a wind turbine tower supporting a nacelle and a rotor with a number of (typically, three) pitch-adjustable rotor blades mounted thereto. A wind turbine is prone to vibrations such as nacelle, tower or rotor blade movement. It is known that certain types of vibrations may be damped by active pitching of the rotor blades or adjusting generator torque.

As the rotor of a wind turbine rotates, the wind turbine tower may oscillate or vibrate in one or more directions, e.g. side-to-side or fore-aft. The tower may have various modes of natural vibration frequencies. In the case of a floating platform wind turbine system, e.g. an offshore system, then a natural vibration frequency may be a coupled mode between the tower and a platform on which the wind turbine floats.

The rotational frequency of a wind turbine rotor—i.e. the frequency with which a complete rotation of the rotor is completed—may be referred to as a 1P frequency. The frequency at which a rotor blade passes the tower for a wind turbine with three blades may be referred to as 3P, which may then result in 3P frequency content in the tower.

The coupled mode of a floating system is typically of relatively high frequency. The coupled mode may be driven by the stiffness and mass of the tower and floating platform. The coupled mode frequency of the floating system and the 3P frequency in the tower may be close to one another or may even intersect, particularly when the rotor is close to the nominal rotor speed, e.g. when the rotor speed is at an upper end of partial load operation, and for all of full-load operation, of the wind turbine. In general, the margin between coupled mode and tower 3P frequencies is typically relatively small, and typically less than ten percent when the rotor is rotating at nominal speed. This can cause relatively high levels of fatigue in the tower of a floating platform wind turbine system, which can significantly reduce the lifespan of the tower. High frequency vibrations of the tower (and nacelle) of an onshore wind turbine (i.e. not a floating platform system) may also result in tower fatigue, for instance in relatively stiff onshore wind turbine tower designs.

It is against this background to which the present invention is set.

SUMMARY OF THE INVENTION

According to an aspect of the invention, there is provided a controller for a wind turbine having three rotor blades. The controller is for adjusting collective pitch of the three rotor blades. The controller is configured to receive a sensor signal, from one or more sensors of the wind turbine, indicative of wind turbine rotor loading in a fore-aft direction. The controller is configured to determine, based on the received sensor signal, a first component in the fore-aft direction, the first component including high frequency collective content, greater than 2P frequency content, from the received sensor signal. The controller is configured to generate, based on the first component, a second component that is orthogonal to the first component. The controller is configured to rotate the first and second components about a phase angle to obtain a first phase-shifted component and a second phase-shifted component. The controller is configured to determine a collective pitch reference offset value for the three rotor blades based on the first phase-shifted component or the second phase-shifted component. The controller is configured to transmit a control signal to adjust pitch of the three rotor blades based on the determined collective pitch reference offset value.

To generate the second component, the controller may be configured to apply one of: a second-order generalised integrator; and, a leaky integrator.

The one or more sensors of the wind turbine may include a respective flap load sensor for each of the three blades. The received sensor signal may include a flap loading signal from each of the flap load sensors indicative of flap loading on each of the respective rotor blades. The controller may be configured to combine the received flap loading signals to obtain a combined flap loading signal. The first component may be determined based on the combined flap loading signal.

The one or more sensors may be one or more acceleration sensors located in a tower or a nacelle of the wind turbine. The sensor signal may be an acceleration signal from the one or more acceleration sensors and being indicative of fore-aft acceleration of the tower and the nacelle.

To determine the collective pitch reference offset value, the controller may be configured to multiply the first phase-shifted component or the second phase-shifted component by a gain. Alternatively, to determine the collective pitch reference offset value, the controller may be configured to multiply the first and second components by the gain prior to the rotation about the phase angle being applied.

To determine the collective pitch reference offset value, the controller may be configured to: apply a rotation transformation based on 3P phase to the first and second phase-shifted components to obtain first and second 3P phase-shifted components; apply an amplitude-limiting factor to the first and second 3P phase-shifted components to obtain first and second 3P amplitude-limited, phase-shifted components; and, apply an inverse rotation transformation based on the 3P phase to the first and second 3P amplitude-limited, phase-shifted components to obtain first and second amplitude-limited, phase-shifted components, the collective pitch reference offset value being determined based on the first amplitude-limited, phase-shifted component or the second amplitude-limited, phase-shifted component.

The amplitude-limiting factor may be determined based on a pump capacity of a hydraulic pitch system of the wind turbine for adjusting pitch of the rotor blades.

The phase angle may be defined based on an operating condition of the wind turbine. Optionally, the operating condition may be a function of pitch angle of the rotor blades. Optionally, the operating condition may be a function of the speed of rotation of the rotor. Optionally, the operating condition may be a function of wind speed in the vicinity of the wind turbine. If the wind turbine is an off-shore wind turbine, then the operating condition may be a function of a misalignment between wind direction and wave direction in the vicinity of the wind turbine.

Prior to determining the first component, the controller may be configured to apply a high-pass filter to remove OP frequency content from the received sensor signal.

The controller may be configured to remove 1P frequency content from the received sensor signal, where 1P is the frequency with which a complete rotation of the rotor is completed. This may be performed prior to rotating the first and second components about the phase angle.

Prior to rotating the first and second components about the phase angle, the controller is configured to: apply a coordinate transformation based on 3P phase to the first and second components to obtain first and second 3P components; and, determine an amplitude of the first and second 3P components. The controller may be configured to perform the rotation of the first and second components about the phase angle, the determination of the collective pitch reference offset value, and the transmission of the control signal only if the determined amplitude is greater than a predefined threshold amplitude.

The controller may be configured to activate to determine the collective pitch reference offset value and transmit the control signal based on the collective pitch reference offset value only if the wind turbine is operating in a full-load region of a power curve of the wind turbine.

The controller may be configured to receive an acceleration signal from an acceleration sensor of the wind turbine tower, the acceleration signal being indicative of fore-aft oscillation of the tower. The controller may be configured to activate to determine the collective pitch reference offset value and transmit the control signal based on the collective pitch reference offset value only if the fore-aft oscillation of the tower is greater than a predefined oscillation level.

According to another aspect of the invention there is provided a controller as defined above. Optionally, the wind turbine is an offshore wind turbine in which the tower is coupled to a floating platform.

According to another aspect of the invention there is provided a method for controlling a wind turbine having three rotor blades. The method is for adjusting collective pitch of the three rotor blades. The method comprises receiving a sensor signal, from one or more sensors of the wind turbine, indicative of wind turbine loading in a fore-aft direction. The method comprises determining, based on the received sensor signal, a first component in the fore-aft direction, the first component including high frequency collective pitch content, greater than 2P frequency content, from the received sensor signal. The method comprises generating, based on the first component, a second component that is orthogonal to the first component. The method comprises rotating the first and second components about a phase angle to obtain a first phase-shifted component and a second phase-shifted component. The method comprises determining a collective pitch reference offset value for the three rotor blades based on the first phase-shifted component or the second phase-shifted component. The method comprises transmitting a control signal to adjust pitch of the three rotor blades based on the determined collective pitch reference offset value.

BRIEF DESCRIPTION OF THE DRAWINGS

Examples of the invention will now be described with reference to the accompanying drawings, in which:

FIGS. 5(a), 5(b) and 5(c) show plots that indicate performance of the controller of FIG. 2 over time; in particular.

DETAILED DESCRIPTION

Figure 1:
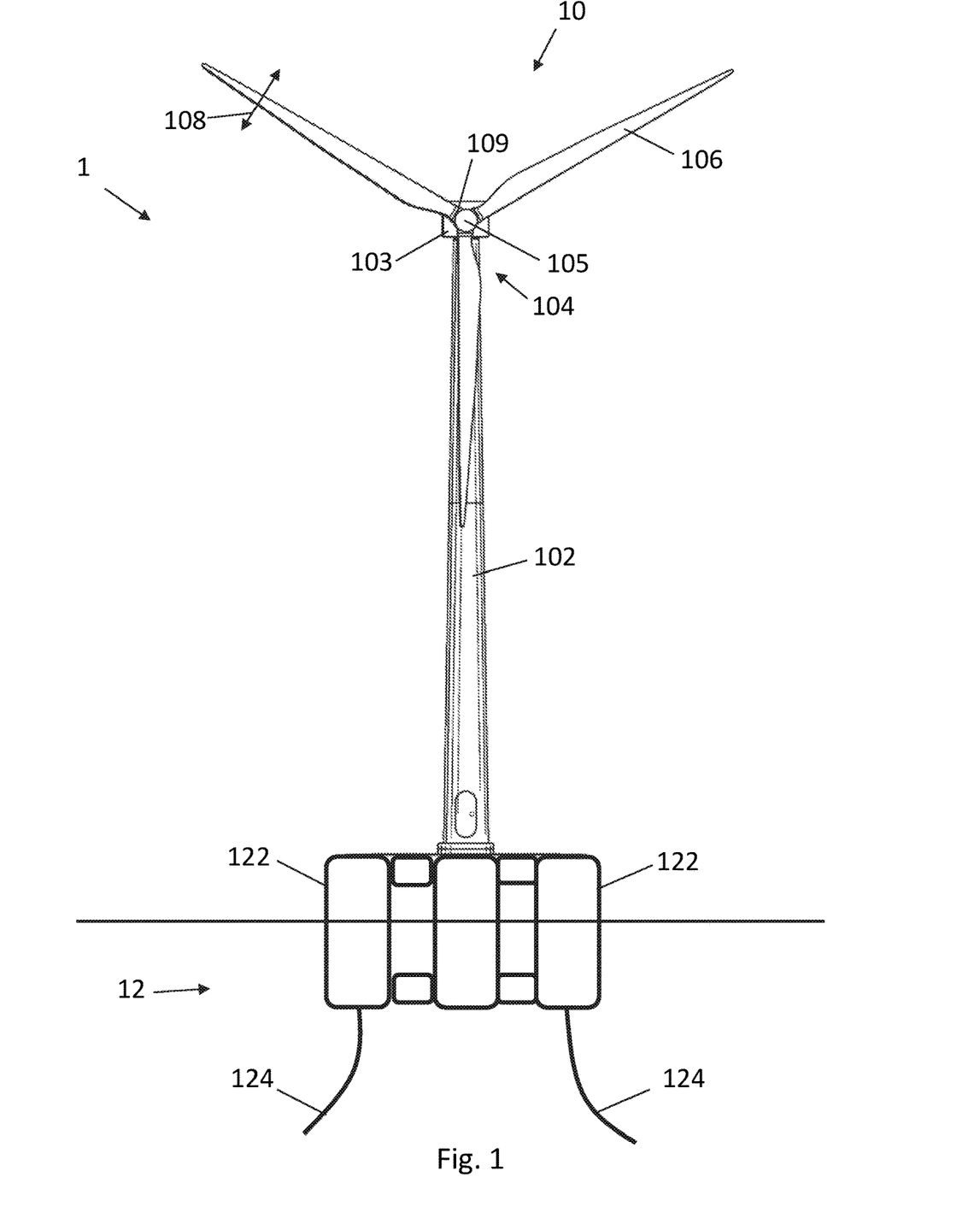
FIG. 1 schematically illustrates a wind turbine in accordance with an aspect of the invention.

FIG. 1 illustrates, in a schematic view, an example of a wind turbine 10. The wind turbine 10 includes a tower 102, a nacelle 103 disposed at the apex of, or atop, the tower 102, and a rotor 104 operatively coupled to a generator housed inside the nacelle 103. In addition to the generator, the nacelle 103 houses other components required for converting wind energy into electrical energy and various components needed to operate, control, and optimise the performance of the wind turbine 10. The rotor 104 of the wind turbine 10 includes a central hub 105 and three rotor blades 106 that project outwardly from the central hub 105. Moreover, the wind turbine 10 comprises a control system or controller (not shown in FIG. 1). The controller may be placed inside the nacelle 103, in the tower 102 or distributed at a number of locations inside (or externally to) the turbine 10 and communicatively connected to one another. The rotor blades 106 are pitch-adjustable. The rotor blades 106 can be adjusted in accordance with a collective pitch setting, where each of the blades are set to the same pitch value. The rotor blades 106 may additionally be adjustable in accordance with individual pitch settings, where each blade 106 may be provided with an individual pitch setpoint.

In some examples, the wind turbine 10 includes blade load sensors placed at, or in the vicinity of, each blade root 109 in a manner such that the sensor detects loading in the blade 106. Blade load signals from such sensors may be used to determine how to adjust the pitch of each of the individual blades 106. Depending on the placement and the type of sensor, loading may be detected in the flap (flapwise) direction (in/out of plane) or in the edge (edgewise) direction 108 (in-plane). Such sensors may be strain gauge sensors or optical Bragg-sensors, for instance. As the sensors are placed on the rotating blades 106, such load signals for each of the adjustable rotor blades 106 are measured in the rotating reference frame of the rotor 104.

Within each blade 106 is a blade load sensor. In different examples, more than one blade load sensor may be provided in each blade. The blade load sensors are arranged to measure flap loading on the blades 106.

In the described example, the wind turbine 10 is part of a floating platform wind turbine system 1. The floating system 1 may be (part of) an offshore wind turbine installation, i.e. an installation located away from land in the ocean or sea. In addition to the wind turbine 10, the floating system 1 includes a floating platform 12. The floating platform 12 may be attached to the ground, e.g. the sea bed, in any suitable manner. In particular, there are various different types of floating platform designs or concepts, including so-called tripod, tension-leg platform (TLP), semi-submersible, and spar platforms. FIG. 1 illustrates an example in which the floating platform is of semi-submersible type, having has three pillars 122 (partially submerged in water 2) and tethers 124 for mooring. It will be understood that different numbers of pillars and/or tethers may be used, and that different types of floating platforms may be used. The wind turbine tower 102 is coupled to the platform 12. In some examples, more than one tower may be coupled to the platform 12, such as two or more towers.

Figure 2:
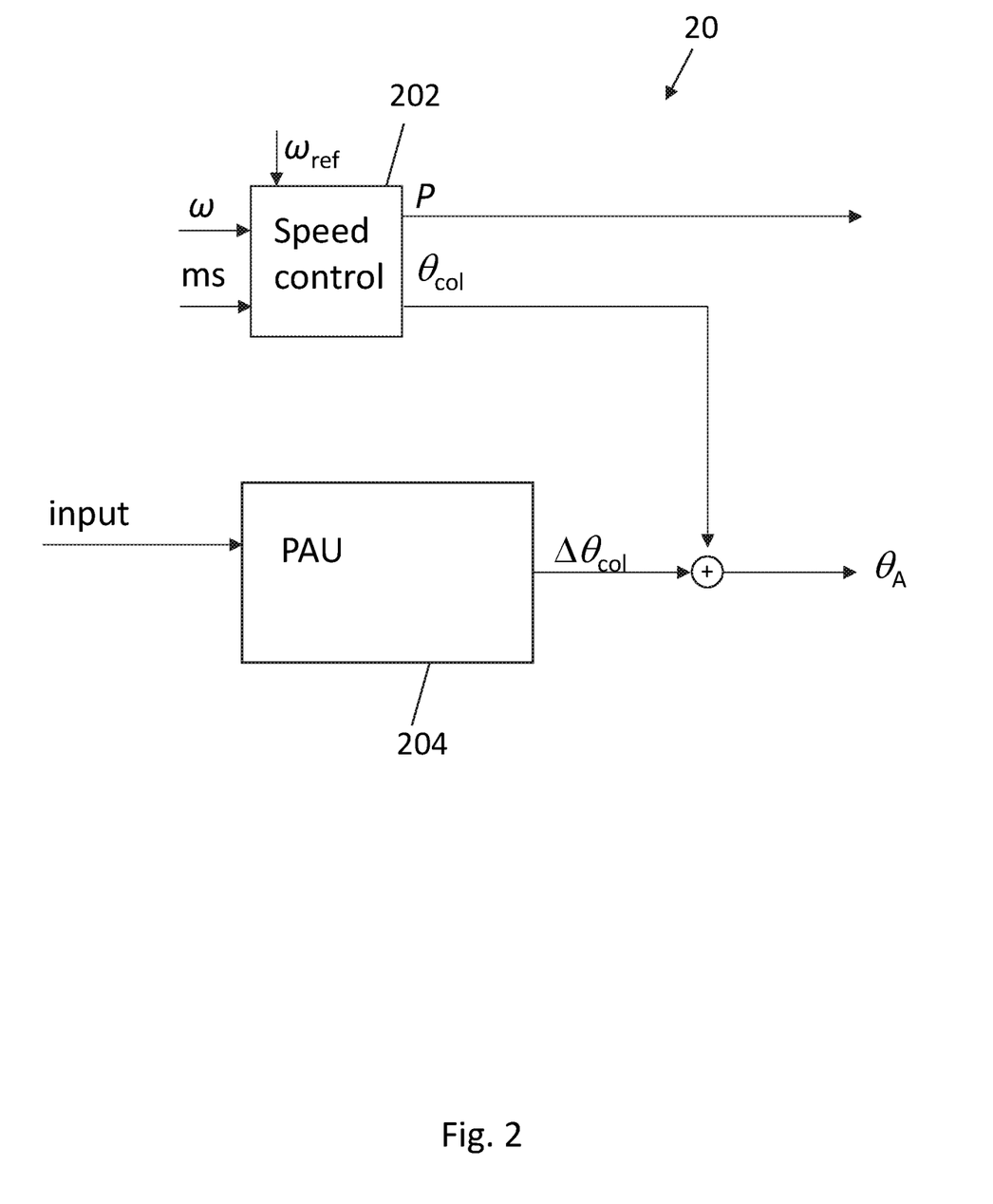
FIG. 2 schematically illustrates a controller of the wind turbine of FIG. 1 in accordance with an aspect of the invention.

FIG. 2 schematically illustrates an example of a controller element 20 (of the wind turbine 10) that includes a feedback speed controller or control block 202 implemented to determine collective pitch actuation signals for controlling pitch of the rotor blades 106. In the illustrated implementation, the speed controller 202 minimises a speed error ($\omega-\omega_{ref}$) between the actual rotor speed, $\omega$, and a reference rotor speed, $\omega_{ref}$, in order to output a requested power P (in the form of a power setpoint) and a collective pitch reference, $\theta col$. The collective pitch reference as determined by the speed controller 202, in view of the rotor speed, may also take further sensor values into account. This is referred to in FIG. 2 as a measurement set, ms, being input into the speed controller 202. The feedback speed controller 202 may be implemented by a PI (proportional-integral), PID (proportional-integral-derivative), or similar control scheme. In one example, the speed controller 202 may alternatively be a model predictive controller which, based on minimising a cost function, is arranged to determine the collective pitch reference and/or the power reference.

FIG. 2 further illustrates a control block or controller 204, which may be referred to as a pitch actuation unit (PAU). In the pitch actuation unit 204, a pitch modification signal, or pitch reference offset value, $\Delta\theta_{col}$ is determined based on one or more input signals. The input signals and operation of the PAU 204 is described in greater detail below. The offset value $\Delta\theta_{col}$ is superimposed onto the collective pitch reference $\theta_{col}$ to provide a resulting or overall collective pitch reference or modification signal $\theta_A$ that can be applied to the pitch actuators of the rotor blades 106.

The controller 20 transmits the collective pitch reference signal to pitch actuators to control pitch angle of the rotor blades 106 in accordance with the collective pitch signal. The signal may be applied in a cyclic manner.

The described controller 20 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

The present invention is directed to reducing levels of fatigue in the wind turbine tower 102. In particular, the invention is directed to reducing tower fatigue that arises as a result of high frequency content in the tower movement. Specifically, the invention is aimed at reducing tower fatigue resulting from excitations that occur when the 3P frequency coincides with, or is in relatively close proximity to, the coupled mode frequency content arising as a result of the coupling between the tower and floating platform of a floating platform wind turbine system, e.g. offshore system. The invention can also be used to reduce tower fatigue resulting from excitations that occur when the 3P frequency coincides with, or is in relatively close proximity to, a natural mode of the tower of an onshore wind turbine.

The present invention provides for controlling pitch of the wind turbine rotor blades to reduce tower fatigue resulting from 3P being close to, or being at, the coupled mode frequency. In particular, the invention provides for changing the loading in the wind turbine rotor at 3P and/or the coupled mode frequency, so as to minimise the excitation of the coupled mode (or tower natural mode). Specifically, the invention provides for controlling high frequency content—which may be defined as frequency content greater than 2P, i.e. having a higher frequency than 2P—by controlling or adjusting a phase lead/lag, and optionally an amplitude, of a collective pitch reference offset used to control or adjust pitch of the wind turbine rotor blades. As the oscillation to be targeted is in the tower fore-aft direction, control of collective blade pitch is appropriate.

In the described example, the PAU 204 of FIG. 2 is used to determine the collective pitch adjustment value, or collective pitch reference offset value, $\Delta\theta_{col}$, for the rotor blades 106 to reduce tower fatigue.

The PAU 204 may include various functional or processing blocks/modules/units to perform respective processing tasks/operations. In one example, the input signal to the PAU 204 is sensor data from the blade load sensors. In this example, the blade load sensors are flap load sensors that indicate loading on the respective blade 106 in the flapwise direction. The PAU 204 receives data from each of the three blade sensors.

The sensor data received from the flap load sensors is used to obtain a three-dimensional vector, where each value of the vector indicates a flap root bending moment associated with a respective one of the three blades. The flapwise load signals are measured in a rotating or rotor reference frame. The rotating reference frame may be in a rotor rotational plane of the wind turbine 10, and may be centred at the rotor 104, for instance.

The flapwise load signals may be coordinate transformed by an m-blade (multi-blade) coordinate transformation. The transformation takes the three rotating signals into a fixed reference frame along a first reference direction d and a second reference direction q. The transformation makes it possible to identify 3P frequency content in the tower movement from the disturbances in the blade flapwise load signals. In general, fore-aft motion of the tower 102 is influenced by collective disturbances on the rotor, hence a consideration of collective flap load can assist in the aim of reducing tower fatigue resulting from tower fore-aft motion.

In another example, the input signal to the PAU 204 is sensor data indicative of tower motion. In particular, in this example one or more acceleration sensors located in the wind turbine tower 102 or nacelle 103 provide an acceleration measurement signal that is indicative of fore-aft acceleration of the tower 102 and the nacelle 103. Like the blade flap load signal in the above-mentioned example, the tower acceleration signal includes 3P collective frequency content. However, in addition, the tower acceleration signal includes frequency content of the coupled mode between the tower 102 and the floating platform 12. In this example, the controller 204 may therefore be capable of acting on, and mitigating the adverse effects of, both 3P and coupled mode frequency content, where the coupled mode frequency may be relatively proximal to the 3P frequency. In this way, the controller 204 may be regarded as a high-frequency controller 24 that acts on high frequency content, which may be defined as frequency content greater than 2P.

In the following description, the input signal to the controller 204 is a single component indicative of tower movement in the fore-aft direction, and may be obtained from the blade flap load signals or the tower acceleration signal.

As mentioned above, the invention provides for high frequency content control by applying a phase shift to rotate fore-aft signal components about a phase angle to obtain phase-shifted components. Phase shifts, or rotation operations, generally need a pair of mutually orthogonal signals in order to be implemented. As the controller input signal only appears as a single component, then there is no natural orthogonal term/signal to pair it with for the purpose of applying a phase shift (in a flexible manner).

Figure 3:
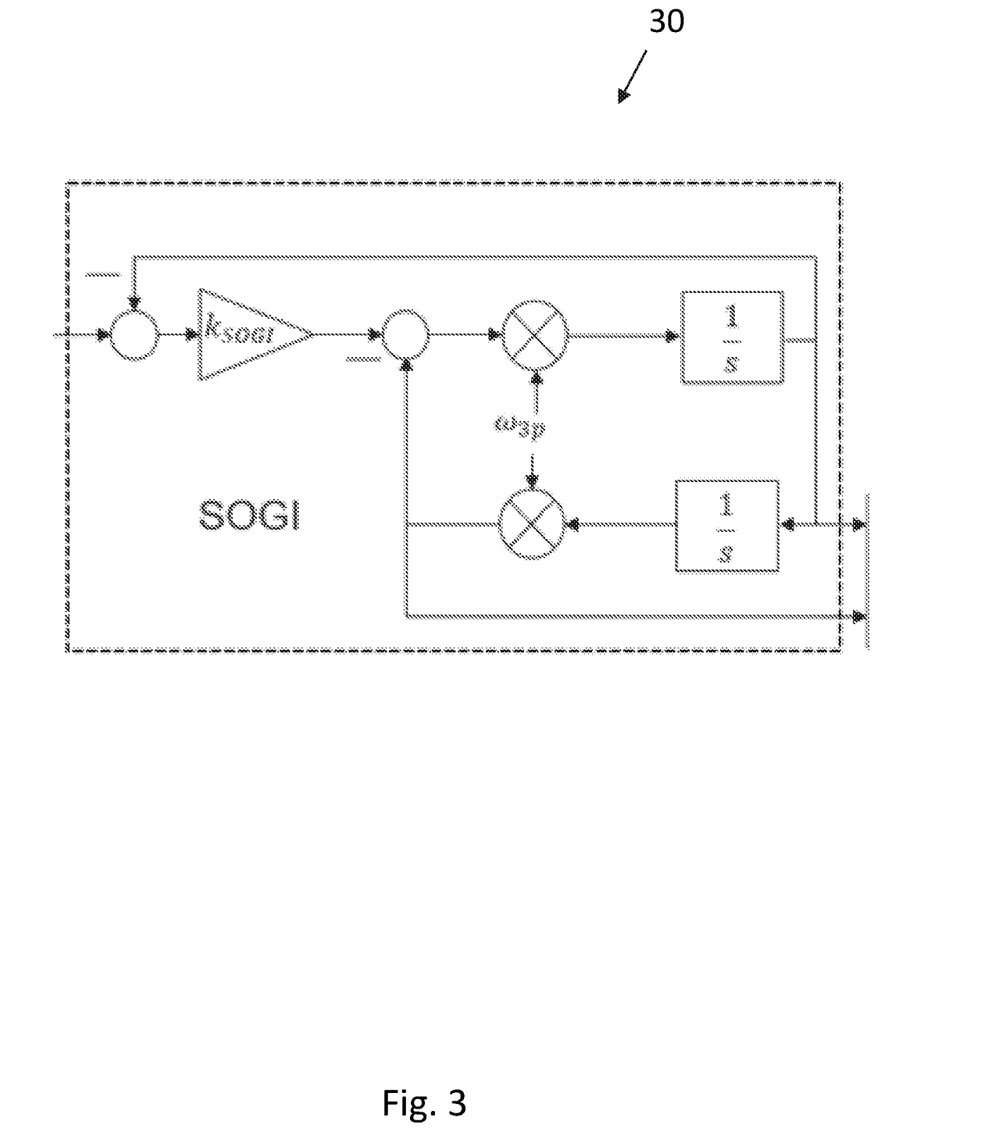
FIG. 3 schematically illustrates a second order generalised integrator module implemented by the controller of FIG. 2.

Examples of the invention therefore provide for generating a further (second) signal that is orthogonal to the (first) signal. In one example, a second-order generalised integrator (SOGI) may be used/applied to generate a second component that is orthogonal to a first component obtained from the controller input signal. FIG. 3 schematically illustrates the structure/topology of a SOGI module 30 that may be implemented by the PAU 204. The SOGI 30 acts like a resonant filter, with peak response at $\omega_{SOGI}$. In the described example, the peak response is set to 3P, i.e. $\omega_{SOGI}=\omega_{3P}$. The SOGI topology has alpha and beta channels that are orthogonal components at all frequencies. Furthermore, for an appropriate tuning of the SOGI, content at a given frequency local to or at 3P is of near-equal magnitude in the alpha and beta channels when $\omega_{SOGI}$ is set to 3P. That is, for an appropriate tuning of the SOGI, the signal due to the $2^{nd}$ coupled mode will also be equal in magnitude for the alpha and beta channels owing to the proximity of the coupled mode frequency to 3P. Thus, the alpha channel has the same phase and magnitude as the input signal to the SOGI 30 in the range of frequencies of interest ($2^{nd}$ coupled mode and 3P).

The controller input signal may also contain content at very high frequencies; that is, greater than 3P. This higher frequency content is naturally attenuated in both the alpha and beta channels of the SOGI 30 as a result of the SOGI topology.

The controller input signal, either collective flap loading or tower fore-aft acceleration, can also include lower frequency content, in particular OP. As such, this lower frequency content is included in the input to the SOGI 30. This lower frequency content may be less well attenuated in the alpha channel of the SOGI 30. As such, a high pass filter may be applied to the signal obtained from the neutral channel of the m-blade transformation prior to applying the SOGI 30 to the signal. This is to ensure that the PAU 204 does not act on OP thrust in the signal.

Furthermore, the controller input may include some frequency content at 1P as a result of imbalance in the rotor 104. This may be removed prior to, or after, applying the SOGI 30. The 1P content may be removed in any suitable manner. For instance, the 1P may be removed by using a notch filter. Alternatively, the 1P content may be removed by applying appropriate frame transformation operations in conjunction with high pass filters. This latter approach may be beneficial because of its lack of gain and phase distortion on targeted high frequency content.

The remaining content in the alpha and beta output channels of the SOGI 30 is then due only to high frequency content local to 3P. As the alpha and beta output channels are mutually orthogonal, then they may be used together to create a phase shift by performing/applying a rotation operation about a phase angle γ, which may be applied as follows:

$$\begin{bmatrix} M_{\alpha-rot}^{3P} \\ M_{\beta-rot}^{3P} \end{bmatrix} = \begin{bmatrix} \cos\gamma & -\sin\gamma \\ \sin\gamma & \cos\gamma \end{bmatrix} \begin{bmatrix} M_{\alpha}^{3P} \\ M_{\beta}^{3P} \end{bmatrix}$$

where $M_\alpha^{3P}$, $M_\beta^{3P}$ are the first and second mutually orthogonal components (i.e. from the alpha and beta channels) from the SOGI 30, $M_{\alpha-rot}^{3P}$, $M_{\beta-rot}^{3P}$ are the rotated or phase shifted first and second components, and γ is the phase shift term or rotation angle (phase angle).

The phase shift γ can be any suitable value. Indeed, the phase shift γ can be defined, selected, or determined as needed or desired. An optimal phase for the collective 3P pitch reference offset—i.e. a phase that is most appropriate for reducing tower fatigue—may vary with operating point of the wind turbine 10. For instance, an optimal phase may change in dependence on changing rotor speed, wind speed in the vicinity of the wind turbine 10, and/or pitch angle of the rotor blades 106. If the wind turbine 10 is an offshore wind turbine, then an optimal phase may change in dependence on a misalignment between wind direction and wave direction in the vicinity of the wind turbine 10. The phase shift γ may therefore be scheduled on operating condition, as desired.

The phase shift to rotate the two components about a phase angle is done to compensate for a phase distortion of signal filters and mechanical phase shifts associated with the structure of the wind turbine. The phase shift resulting from signal filters can be determined from the analytical expression of the applied filters and their transfer functions. By looking at the filters and the transfer functions at the frequency of interest, it is possible to deduce the total phase shift needed to compensate for the filters used in the signal treatment.

Additionally or alternatively, a tuning process may be used to determine a phase shift in view of the operating point of the wind turbine. Such a tuning process is typically done in a simulating environment where open loop pitch excitations are applied to excite the wind turbine tower in the fore-aft direction, with the resulting response establishing the phase relationship between the pitch action and the tower response. By varying the operating point a lookup table mapping the operating point to the phase angle can be determined.

In order to scale the first and second components to a pitch reference, then a (controller) gain may be applied to the first and second components. The gain may be defined, selected or determined as appropriate. The gain may be applied before or after applying the phase shift described above.

In addition to applying a phase shift to the first and second components, amplitude-limiting functionality (or amplitude-saturation functionality) can also readily be applied (as the components are mutually orthogonal). Such amplitude-limiting functionality can be applied to ensure there is satisfactory control over the pitch reference offset. In particular, high frequency pitch control (e.g. higher than 2P, such as 3P control) as described here is relatively demanding for a wind turbine pitch system. Indeed, the amount of pitch control performed is limited by a pump capacity of the hydraulic pitch system. Also, in low turbulence wind conditions the blade bearings will not be moving a significant amount. If high frequency pitching is performed on top of this, then parts of the bearing may suffer from poor lubrication, leading to wear and fatigue. Therefore, relatively low amplitude pitching may be desired for high frequency control.

In the described example, amplitude-limiting functionality first involves applying a rotation operation to the phase-shifted first and second components. In particular, the rotation is based on 3ψ, i.e. three times the 1P phase or azimuth, as follows:

$$\begin{bmatrix} M_n^d \\ M_n^q \end{bmatrix} = \begin{bmatrix} \cos 3\psi & \sin 3\psi \\ -\sin 3\psi & \cos 3\psi \end{bmatrix} \begin{bmatrix} M_n^\alpha \\ M_n^\beta \end{bmatrix}$$

where $M_n^\alpha$, $M_n^\beta$ are the first and second phase-shifted components, and $M_n^d$, $M_n^q$ are the rotated components, which may be referred to as first and second 3P phase-shifted components.

An amplitude-limiting or amplitude-saturating factor may then be applied to each of the first and second 3P phase-shifted components to obtain first and second 3P amplitude-limited, phase-shifted components. This factor may be defined, selected or determined as appropriate. For instance, in one example the amplitude-saturating factor may be determined in dependence on a pump capacity of the hydraulic pitch system, or in dependence on a level of control/usage of the pitch system being instructed by other pitch controllers of the wind turbine 10, e.g. a 1P and/or 2P controller. The amplitude saturation may be scheduled in any suitable manner.

An inverse rotation operation may then be applied to the first and second 3P amplitude-limited, phase-shifted components to obtain first and second amplitude-limited, phase-shifted components as follows:

$$\begin{bmatrix} M_n^\alpha \\ M_n^\beta \end{bmatrix} = \begin{bmatrix} \cos 3\psi & -\sin 3\psi \\ \sin 3\psi & \cos 3\psi \end{bmatrix} \begin{bmatrix} M_n^d \\ M_n^q \end{bmatrix}$$

where in this case $M_n^d$, $M_n^q$ are the first and second 3P amplitude-limited, phase-shifted components and $M_n^\alpha$, $M_n^q$ are the first and second amplitude-limited, phase-shifted components.

One of the first and second amplitude-limited, phase-shifted components may then be used to obtain an appropriately phase-shifted and amplitude-limited collective 3P pitch reference offset signal $\Delta\theta_{col}$ output by the PAU 204.

One or more activation strategies, that act on tower oscillation levels, may be defined for the controller/PAU 204. In one example, the PAU 204 may be configured to activate to output an offset signal $\Delta\theta_{col}$ only when the amplitude of the vibrations/oscillations is sufficiently large to justify pitching the bearing for this purpose. To determine the amplitude, the above-described process of generating mutually orthogonal first and second components may be performed, but without the steps of applying a gain or applying a phase shift. Then the amplitude of the signals may be determined and, if the amplitude is greater than a defined threshold, for instance, then the PAU 204 may be activated to output the offset signal $\Delta\theta_{col}$ to be incorporated into the pitch reference signal sent to the pitch system. In an example, the PAU 204 may be configured to not activate when the wind turbine 10 is operating in partial-load operation. This is because, as described above, the issue of tower fatigue as a result of the coupled mode is particularly apparent when the rotor is rotating at nominal speed, i.e. during full-load operation (and perhaps less apparent at different rotor speeds). An activation strategy based on whether one or more other pitch controllers of the wind turbine 10 are needed at a given time may also be implemented. For instance, if a 1P and/or 2P controller of the wind turbine 10 are not activated at a particular time, then preference may be given to the present controller 204 as a greater amount of pump capacity relative to when the 1P and/or 2P controllers are activated may be available.

Although the described example uses a SOGI to generate mutually orthogonal components that may then be phase shifted and amplitude limited, it will be understood that different types of filter or integrator may be used for this purpose in a corresponding manner, such as a leaky integrator (low pass filter).

Figure 4:
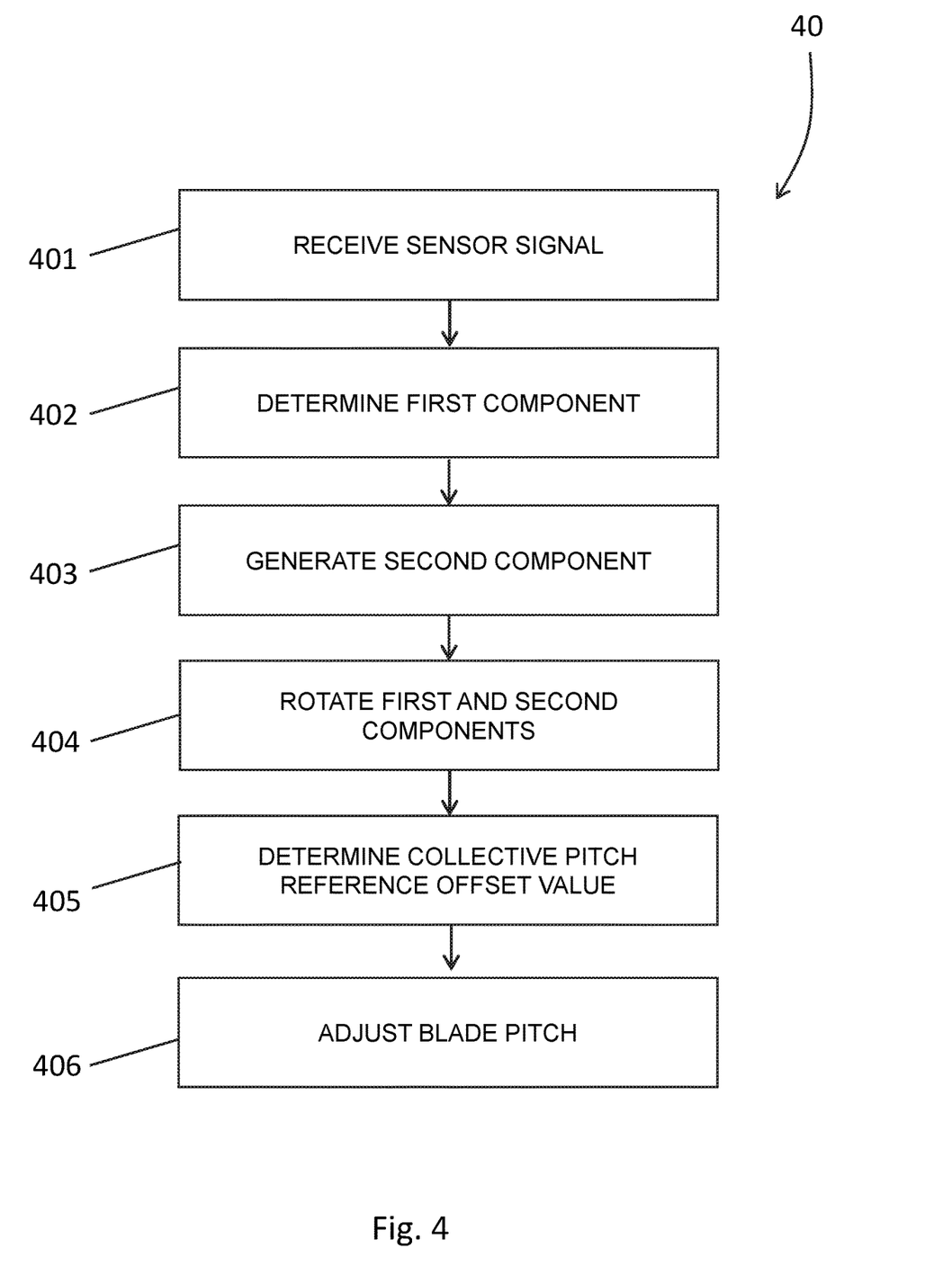
FIG. 4 shows the steps of a method performed by the controller of FIG. 2.

FIG. 4 summarises the steps of a method 40 performed by the controller/PAU 204 in accordance with examples of the invention. The controller 204 is for adjusting collective pitch of the three rotor blades 106. At step 401 of the method 40, the controller 204 receives a sensor signal, from one or more sensors of the wind turbine 10, indicative of wind turbine rotor loading in a fore-aft direction. The sensor signal may be blade load flap measurements from one or more sensors on each of the three rotor blades 106, indicative of the flap load experienced by each of the rotor blades 106. Alternatively, the sensor signal may be a tower acceleration signal from one or more accelerometers of the tower 102 and/or nacelle 103 of the wind turbine 10, indicative of an acceleration (including fore-aft acceleration) of the tower 102.

Step 402 of the method 40 includes determining, based on the received sensor signal, a first component in the fore-aft direction of the wind turbine 10, the first component including high frequency collective content, greater than 2P frequency content, from the received sensor signal. Step 403 of the method 40 includes generating, based on the first component, a second component that is orthogonal to the first component. This may be performed by application of an appropriate filter or integrator, such as a second order generalised integrator or a leaky integrator.

Step 404 of the method 40 includes rotating the first and second components about a phase angle to obtain a first phase-shifted component and a second phase-shifted component. The phase angle may be defined or determined in dependence on an operating condition or operating point of the wind turbine 10.

The method 40 may optionally involve applying a (further) rotation transformation based on 3P phase or azimuth to the phase-shifted components, applying an amplitude-limiting factor to the rotated components, and applying an inverse rotation transformation to obtain amplitude-limited, phase-shifted first and second components.

Step 405 of the method 40 involves determining a collective pitch reference offset value for the three rotor blades based on the first phase-shifted (and optionally amplitude-limited) component or the second phase-shifted (and optionally amplitude-limited) component. Step 406 of the method 40 includes transmitting a control signal to adjust pitch of the three rotor blades 106 based on the determined collective pitch reference offset value.

Figure 5A:
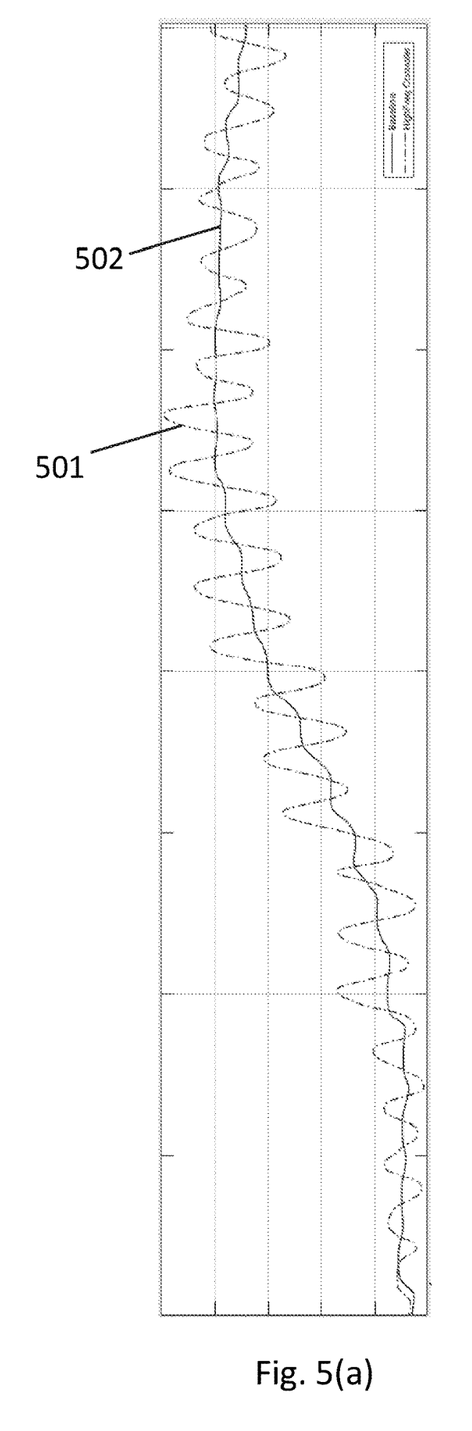
FIG. 5(a) shows collective pitch of rotor blades of the wind turbine of FIG. 1.
Figure 5B:
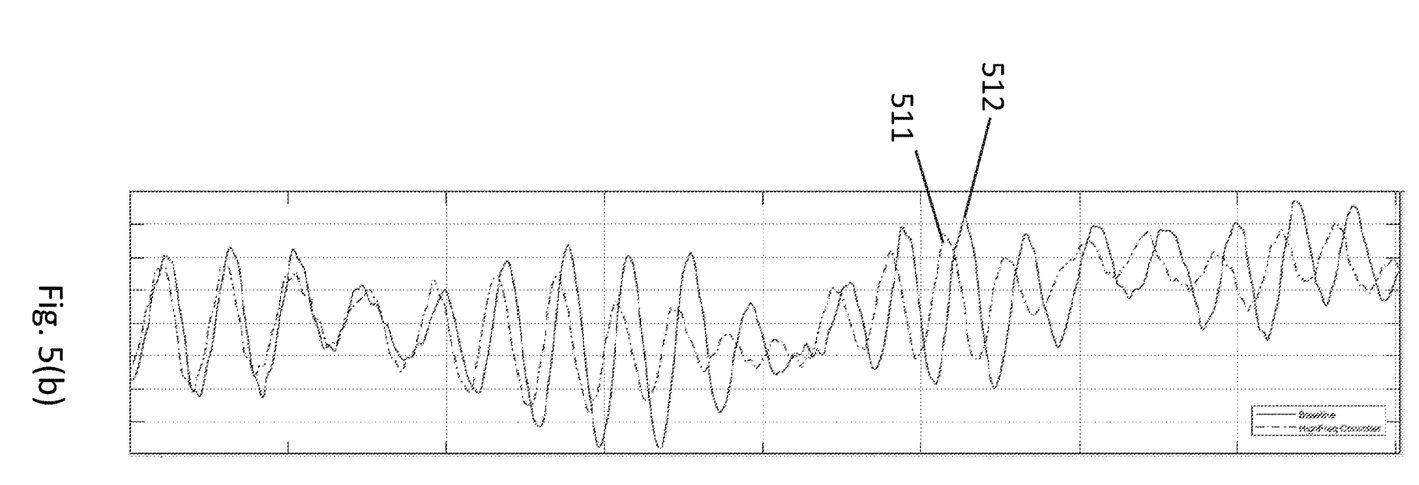
FIG. 5(b) shows side-to-side bending moment of a base of a tower of the wind turbine of FIG. 1.
Figure 5C:
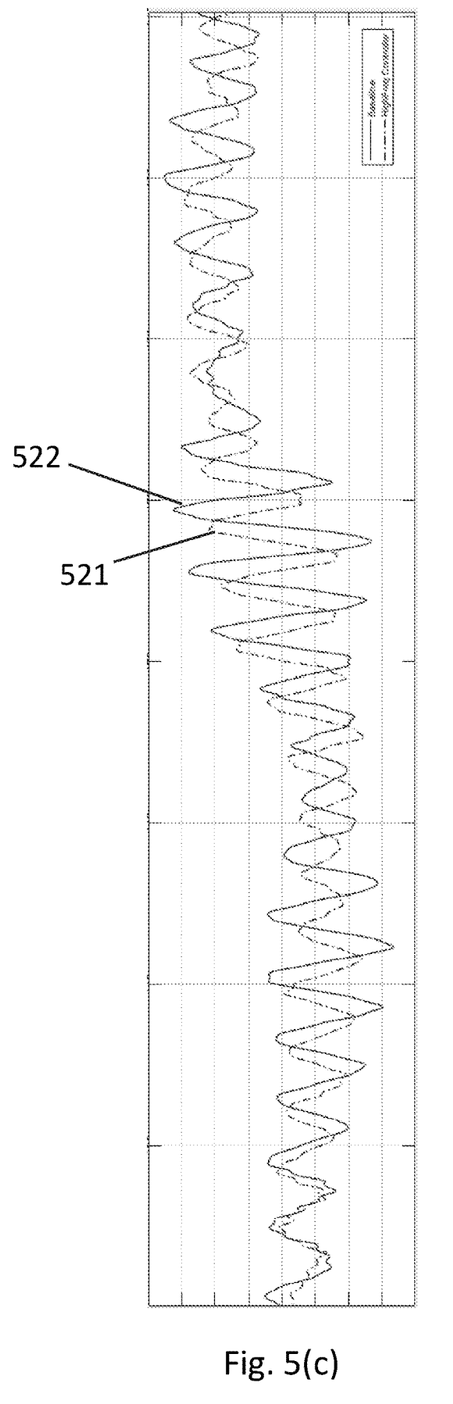
FIG. 5(c) shows fore-aft tower base bending moment.

FIGS. 5(a), 5(b) and 5(c) show plots that indicate performance of the PAU 204 (high frequency controller) over time in accordance with examples of the invention as described above. In particular, FIGS. 5(a), 5(b) and 5(c) show plots of the controller performance over time relative to a baseline performance, i.e. in the absence of the high frequency controller. Specifically, FIG. 5(a) shows the collective pitch 501 of the rotor blades 106 over time relative to the baseline 502. It is seen that the high frequency controller introduces a greater degree of variation relative to the baseline pitch. FIG. 5(b) shows a side-to-side tower base bending moment 511 over time relative to a baseline 512, and FIG. 5(c)

fore-aft tower base bending moment 521 over time relative to a baseline 522. It is seen that the amplitude of the tower vibrations is reduced with the intervention of the high frequency controller. The phase of the vibrations are also shifted by a phase angle.

Many modifications may be made to the described examples without departing from the scope of the appended claims.

Although the above-described examples relate to rotor blade control for a wind turbine system in which the wind turbine tower is coupled to a floating platform, e.g. an offshore system, it will be understood that the controller and methods may also be implemented in onshore wind turbine design to achieve the benefits of reduced tower fatigue.

Although the above-described examples describe the use of filters or integrators that generate mutually orthogonal components to allow for phase shifting and amplitude saturation to be applied for any operating point, it will be understood that different types of filters or integrators that generate a (variable) phase shift without first needing to generate a second (orthogonal) component may instead be used. For instance, a dynamic lead-lag filter may be used to obtain the required phase shift.

The invention claimed is:

1. A controller for a wind turbine having three rotor blades, the controller being for adjusting collective pitch of the three rotor blades, the controller being configured to:
   receive a sensor signal, from one or more sensors of the wind turbine, indicative of wind turbine rotor loading in a fore-aft direction;
   determine, based on the received sensor signal, a first component in the fore-aft direction, the first component including high frequency collective content, greater than 2P frequency content, from the received sensor signal;
   generate, based on the first component, a second component that is orthogonal to the first component;
   rotate the first and second components about a phase angle to obtain a first phase-shifted component and a second phase-shifted component;
   determine a collective pitch reference offset value for the three rotor blades based on the first phase-shifted component or the second phase-shifted component; and
   transmit a control signal to adjust pitch of the three rotor blades based on the determined collective pitch reference offset value.

2. A controller according to claim 1, wherein to generate the second component, the controller is configured to apply one of: a second-order generalised integrator; and, a leaky integrator.

3. A controller according to claim 1, wherein the one or more sensors of the wind turbine include a respective flap load sensor for each of the three blades, wherein the received sensor signal includes a flap loading signal from each of the flap load sensors indicative of flap loading on each of the respective rotor blades, wherein the controller is configured to combine the received flap loading signals to obtain a combined flap loading signal, the first component being determined based on the combined flap loading signal.

4. A controller according to claim 1, wherein the one or more sensors is one or more acceleration sensors located in a tower or a nacelle of the wind turbine, wherein the sensor signal is an acceleration signal from the one or more acceleration sensors and being indicative of fore-aft acceleration of the tower and the nacelle.

5. A controller according to claim 1, wherein, to determine the collective pitch reference offset value, the controller is configured to:
   multiply the first phase-shifted component or the second phase-shifted component by a gain; or,
   multiply the first and second components by the gain prior to the rotation about the phase angle being applied.

6. A controller according to claim 1, wherein, to determine the collective pitch reference offset value, the controller is configured to:
   apply a rotation transformation based on 3P phase to the first and second phase-shifted components to obtain first and second 3P phase-shifted components;
   apply an amplitude-limiting factor to the first and second 3P phase-shifted components to obtain first and second 3P amplitude-limited, phase-shifted components; and,
   apply an inverse rotation transformation based on the 3P phase to the first and second 3P amplitude-limited, phase-shifted components to obtain first and second amplitude-limited, phase-shifted components, the collective pitch reference offset value being determined based on the first amplitude-limited, phase-shifted component or the second amplitude-limited, phase-shifted component.

7. A controller according to claim 6, wherein the amplitude-limiting factor is determined based on a pump capacity of a hydraulic pitch system of the wind turbine for adjusting pitch of the rotor blades.

8. A controller according to claim 1, wherein the phase angle is defined based on an operating condition of the wind turbine; optionally, wherein the operating condition is a function of one or more of: pitch angle of the rotor blades; the speed of rotation of the rotor; wind speed in the vicinity of the wind turbine; and, if the wind turbine is an off-shore wind turbine, a misalignment between wind direction and wave direction in the vicinity of the wind turbine.

9. A controller according to claim 1, wherein, prior to determining the first component, the controller is configured to apply a high-pass filter to remove OP frequency content from the received sensor signal.

10. A controller according to claim 1, wherein the controller is configured to remove 1P frequency content from the received sensor signal.

11. A controller according to claim 1, wherein, prior to rotating the first and second components about the phase angle, the controller is configured to:
    apply a coordinate transformation based on 3P phase to the first and second components to obtain first and second 3P components; and,
    determine an amplitude of the first and second 3P components, wherein the controller is configured to perform the rotation of the first and second components about the phase angle, the determination of the collective pitch reference offset value, and the transmission of the control signal only if the determined amplitude is greater than a predefined threshold amplitude.

12. A controller according to claim 1, wherein the controller is configured to activate to determine the collective pitch reference offset value and transmit the control signal based on the collective pitch reference offset value only if the wind turbine is operating in a full-load region of a power curve of the wind turbine.

13. A controller according to claim 1, wherein the controller is configured to receive an acceleration signal from an acceleration sensor of the wind turbine tower, the acceleration signal being indicative of fore-aft oscillation of the tower, wherein the controller is configured to activate to determine the collective pitch reference offset value and transmit the control signal based on the collective pitch reference offset value only if the fore-aft oscillation of the tower is greater than a predefined oscillation level.

14. A method for controlling a wind turbine having three rotor blades, the method being for adjusting collective pitch of the three rotor blades, the method comprising:

receiving a sensor signal, from one or more sensors of the wind turbine, indicative of wind turbine loading in a fore-aft direction;

determining, based on the received sensor signal, a first component in the fore-aft direction, the first component including high frequency collective content, greater than 2P frequency content, from the received sensor signal;

generating, based on the first component, a second component that is orthogonal to the first component;

rotating the first and second components about a phase angle to obtain a first phase-shifted component and a second phase-shifted component;

determining a collective pitch reference offset value for the three rotor blades based on the first phase-shifted component or the second phase-shifted component; and, transmitting a control signal to adjust pitch of the three rotor blades based on the determined collective pitch reference offset value.

* * * * *